Aug. 22, 1944.  V. SYKORA  2,356,545
METHOD AND APPARATUS FOR CROPPING HOPS
Filed Nov. 18, 1941   4 Sheets-Sheet 2
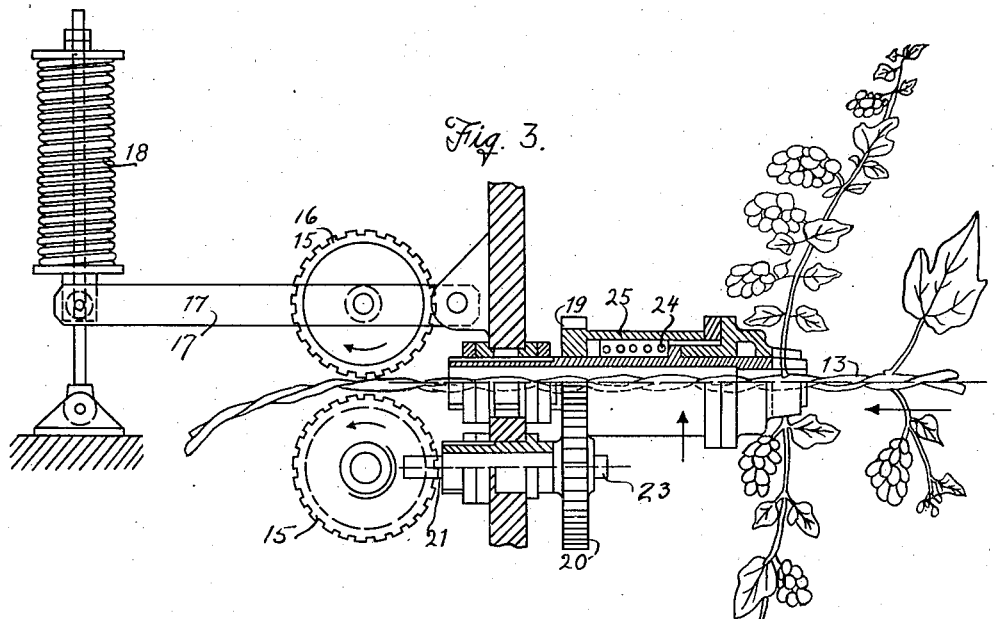
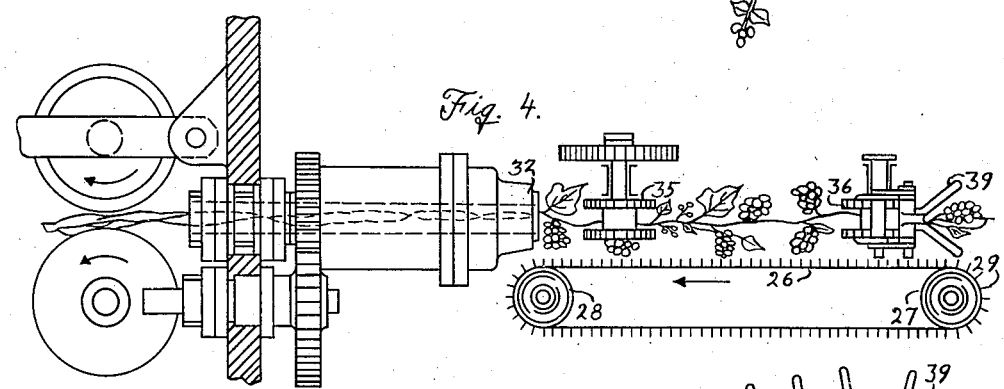
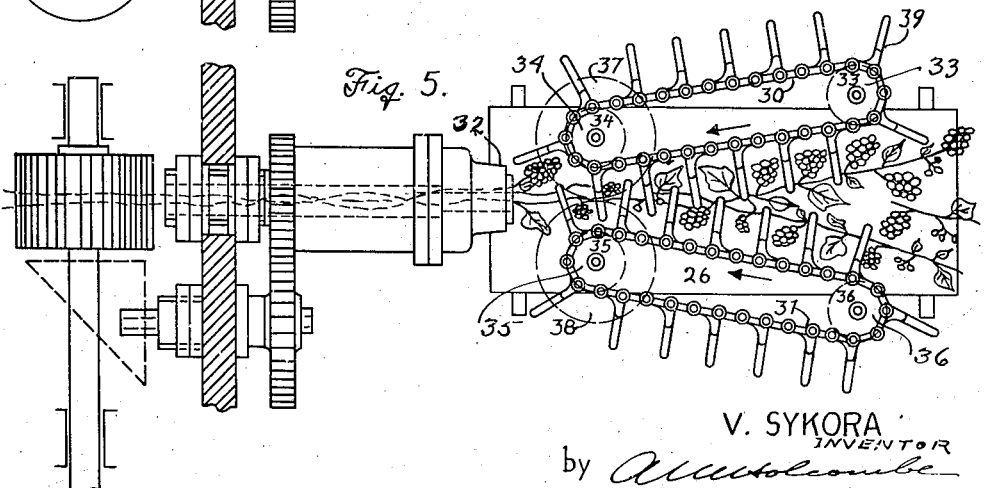
V. SYKORA
INVENTOR
by *[signature]*
ATTORNEY.

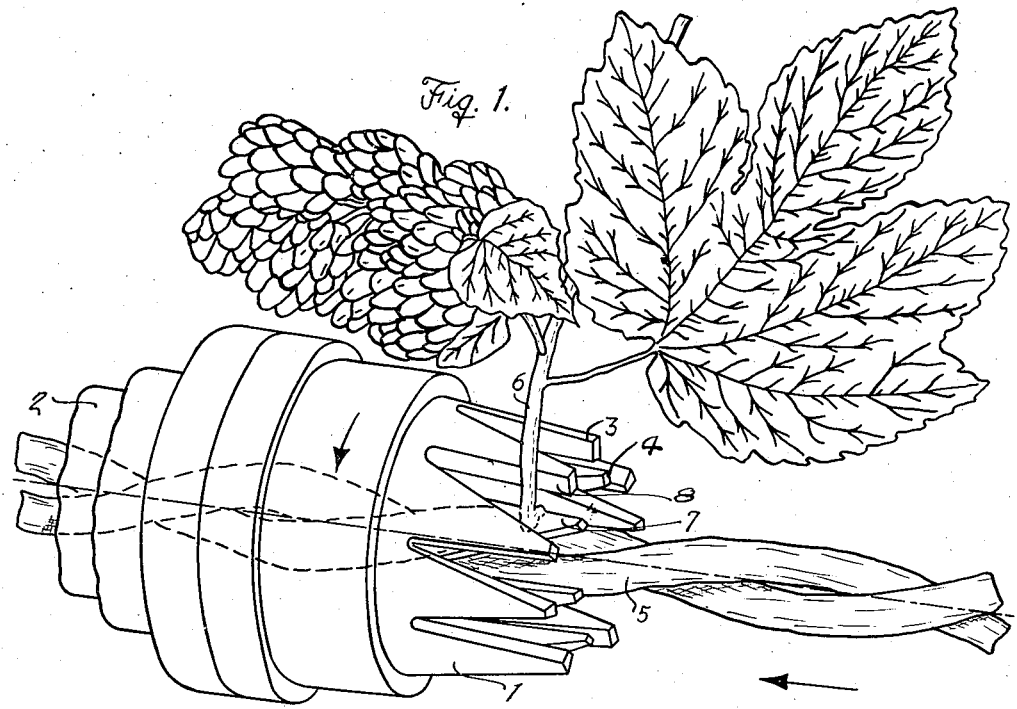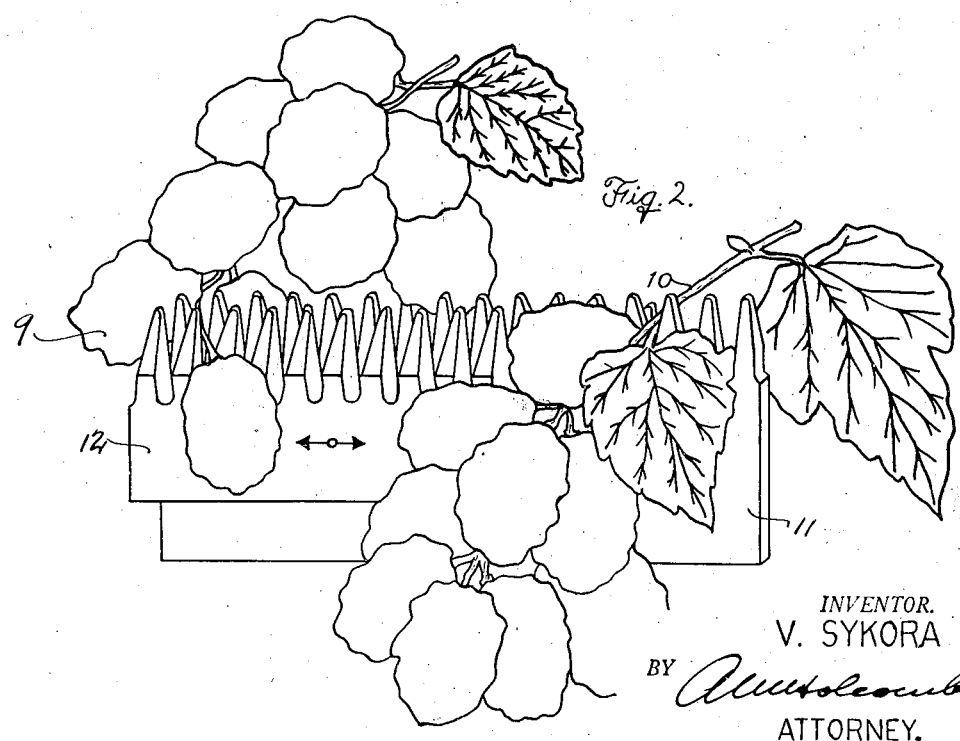

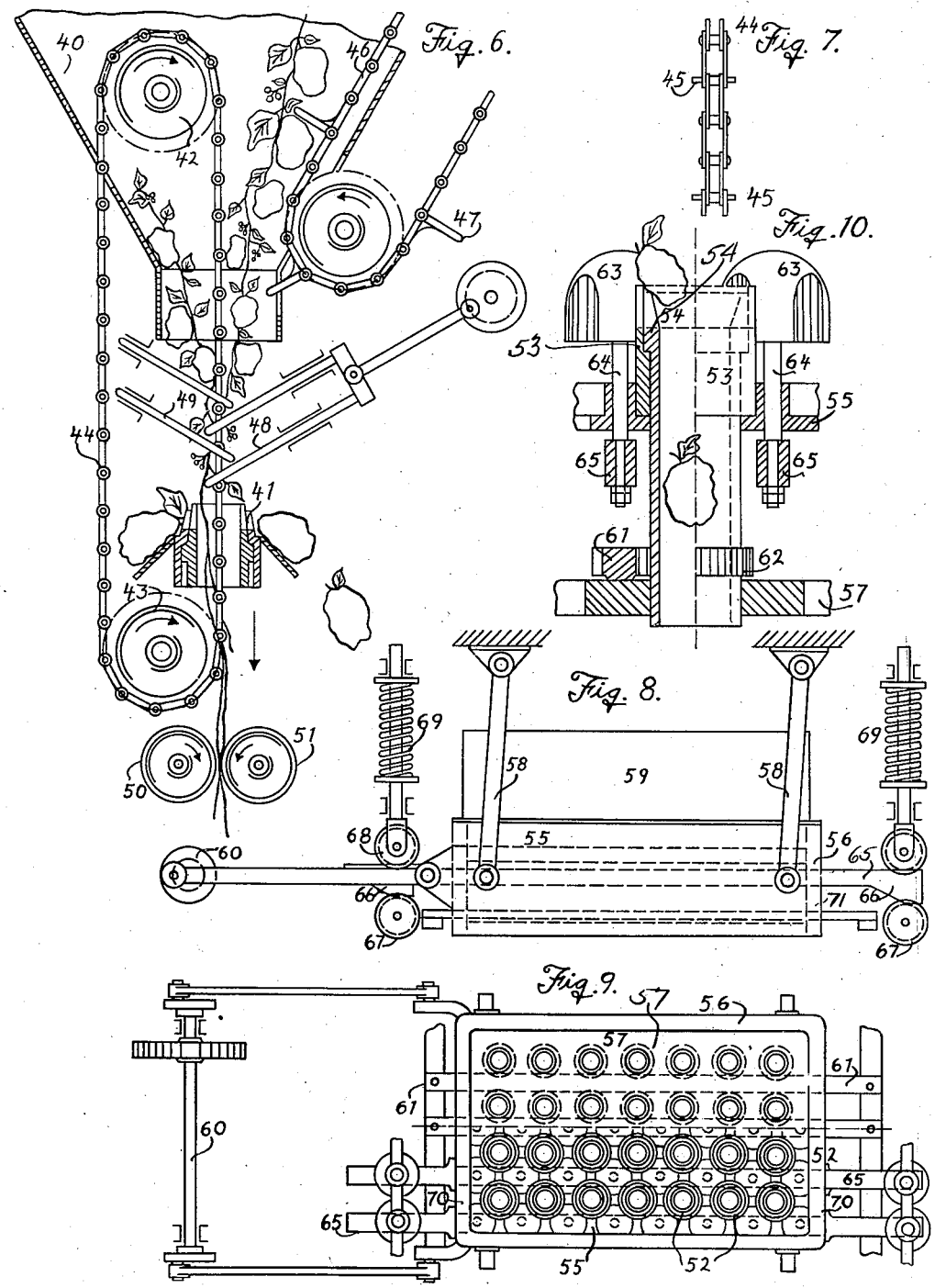

Aug. 22, 1944.   V. SYKORA   2,356,545
METHOD AND APPARATUS FOR CROPPING HOPS
Filed Nov. 18, 1941   4 Sheets-Sheet 4
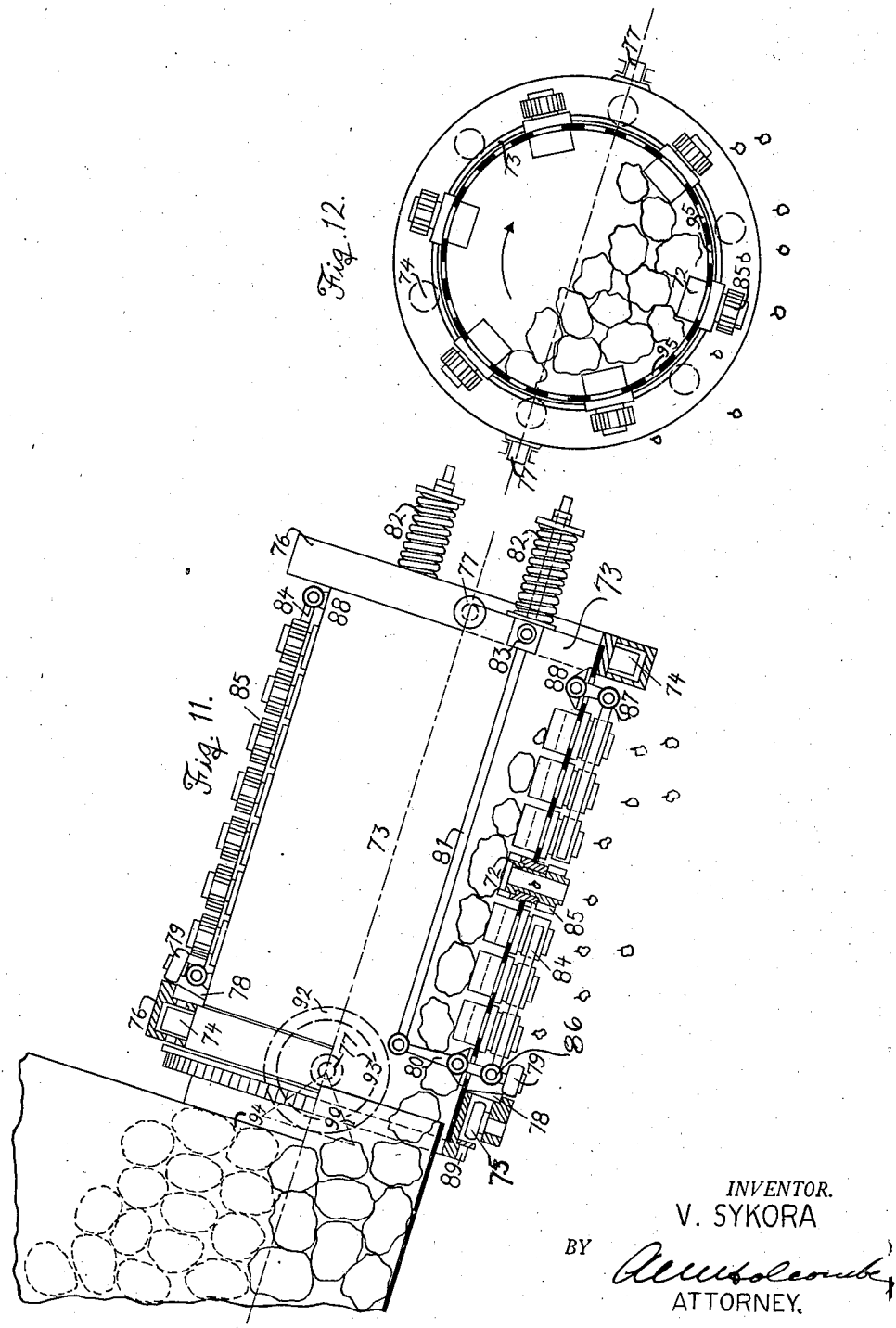
INVENTOR.
V. SYKORA
BY
ATTORNEY.

Patented Aug. 22, 1944

2,356,545

UNITED STATES PATENT OFFICE 2,356,545

METHOD AND APPARATUS FOR CROPPING HOPS

Vladislav Sýkora, Neusattel, Germany; vested in the Alien Property Custodian

Application November 18, 1941, Serial No. 419,569

14 Claims. (Cl. 130—30)

There are useful plants, the blossoms or the stalks and other parts of which are separately utilized. Alternately, two or more parts of the plant are used after their mutual separation. The most important of such plants is the hop and therefore only the hop will be referred to hereinafter. In the case of hops, the pistillate cones or strobiles, hereinafter referred to as strobiles, are utilized. However, the stalks of the hop plant may equally be utilized, e. g., in the textile industry. The leaves may be used as cattle feed.

Hitherto, the hop harvest has been carried out either by hand-picking or mechanically. In the case of hand-working, the strobiles are, as far as possible, plucked singly, thus leaving a small piece of stalk on each strobile, as otherwise the strobile would easily decay on being dried. Such plucking requires a great deal of hand labour which, moreover, can be occupied only during the short harvest season. Hop picking as pure hand labour is therefore very expensive. Furthermore, this working method is largely dependent on the weather prevailing and in the case of long lasting rains the hops can not be harvested in due time thus being depreciated.

The chief drawback of the hitherto used hop cropping machines consists in scraping the hop. The comblike parts scrape the individual strobiles. The stalks are easily torn off close to the strobiles so that the above mentioned decay occurs on drying, the hop flower laying between the individual leaves of the strobiles is strewn out and the crop thus deteriorated.

The present invention consists in a mechanical shearing of the hop and offers, in addition to a high yield, the further advantage that the very important short stalk pieces as above mentioned, are left undamaged on the strobiles. The method and the devices required therefor, being the subject-matter of the present invention, will be described hereinafter. The hop parts shorn apart may, as will also be disclosed, be separated from each other in a clean manner by known means and may then easily be treated for further use.

In carrying this idea of the present invention into effect it is preferable to proceed in three stages. First, the twigs are shorn off the hop stocks, thereupon the strobile bunches are shorn apart so as to form individual strobiles. Alternatively two of the above mentioned working stages may be combined to one single step. The resulting waste refuse consisting of leaves and stalks is removed by well known means, such as shaking, sieving, blowing out or the like. The stalks shorn off the hop stocks may be cut to a suitable length by well known devices and then bound into bales. This treatment facilitates their further utilization. Should wire pieces be included in the resulting refuse which would be detrimental in cattle feeding, such wire pieces may be removed in a well known manner by magnets.

The accompanying drawings, on sheets 1 to 5, Figs. 1 to 16 illustrate diagrammatically the method according to the present invention and, by way of example only, several embodiments of the devices for carrying such method into effect.

Figs. 1 and 2 illustrate in perspective the shearing process, Fig. 1 relating to the use of a ring-shear which will be described hereinafter, Fig. 2 to the use of comblike knives; Figs. 3 to 12 show diagrammatically several modifications of the three working stages of the method according to the present invention, Fig. 3 being a side view showing, partly in section, the separation of the hop twigs from the stocks with the use of the ring-shear, Fig. 4 a side view, partly in section, showing the separation of the strobile bunches from the twigs with the use of the ring-shear, Fig. 5 a corresponding plan view, Fig. 6 illustrating in a vertical section a somewhat modified proceeding in shearing the strobile bunches off the twigs with the use of a ring-shear, Fig. 7 a side view of a detail, Fig. 8 a side view of the ring-shear grate described hereinafter, for shearing apart the strobile bunches, Fig. 9 a corresponding plan view, Fig. 10 showing on an enlarged scale the vertical section of a detail thereof, Fig. 11 in a side view and section a modified proceeding in shearing the strobile bunches apart with the use of ring-shears and Fig. 12 being a cross section thereof. Referring to these illustrations, the method and apparatus according to the invention will now be described more fully.

Referring to Fig. 1. The telescopically arranged tubes 1 and 2 are provided with cutting prongs 3 and 4 on the one end. One of the tubes, in the figure the inner one, is fixed whilst the other, in the figure the outer one, is rotary. Both tubes may also be arranged so as to rotate in opposite directions. This device will hereinafter be referred to as ring-shear. In 5 a plant section, in the case illustrated a double-stalk of the hop stock, is introduced inside the ring-shear and drawn therethrough. The lateral plant branches, in the figure the twig 6 appear with their stalks between the cutting prongs and are shorn off. In Fig. 1, 7 indicates the fixed cutting prong acting in a straight manner, 8 the moved edge of the cutting prongs.

Referring to Fig. 2. The plant portions, in this figure at 9 a strobile, at 10 a strobile bunch, are shorn off by comblike knives 11 and 12. One of these knives, in the figure the knife 11, is fixed, whilst a reciprocated movement in lengthwise direction is imparted to the other knife, 12 in the figure, bearing against the fixed knife.

Referring to Fig. 3.. At 13 the cut off hop stock is introduced inside a ring-shear 14 and drawn through rolls 15 and 16. The roll 15 is firmly supported and driven, the roll 16 is pressed onto the roll 15 by a lever 17 and spring 18 or the like. To facilitate seizing, the rolls may be provided with a surface fluting. Alternatively both rolls may be driven, the movement being transmitted from 15 to 16 in the simplest way by involute front wheels which are able to withstand the axial displacement occurring on the double-stalk of the hop stock being drawn through owing to its uneven thickness. For fostering the passage of the stalks and preventing their being squeezed in the case of an excessive thrust at one place only, two or even more pairs of drawing rolls may be provided. In the embodiment illustrated, the inner tube of the ring-shear is fixed, whilst the outer tube is subjected to a drive with a permanent turning direction. In this case, the drive is provided by cylindrical gears 19 and 20 and bevel gears 21 and 22 from the shaft 23 driving also the roll 15. By such combination of the ring-shear drive with the drive of the drawing rolls, the maintenance of a determined required ratio between the feed speed and the turning speed of the ring-shear may be obtained. A spring 24 which, under co-operation of an intermediate gliding ring 25 presses the outer tube of the ring-shear axially against the inner tube, enables the organs of the ring-shear to yield resiliently in the case of excessive resistances occurring.

Referring now to Figs. 4 and 5. The hop twigs fall on an endless belt 26 running over rollers 27 and 28, one of these rollers being driven and moving the belt in the direction indicated by the arrow. For feeding the twigs along therewith and for preventing them from moving apart from each other, brushlike pins 29 are mounted on said belt. Two sidewise arranged endless chains 30 and 31 provided in a horizontal plane and being oblique relatively to the longitudinal direction are acting to press the hop twigs together and to introduce the stalks thereof into a ring-shear 32. The chain 30 is laid over sprockets 33 and 34, the chain 31 over the sprockets 35 and 36. The sprockets 34 and 35 are coupled through front gears 37 and 38 and are driven. Individual chain links are provided with forks 39 the ends of which being rounded off to prevent the strobiles being punctured. Owing to the abovementioned coupling of the sprockets 34 and 35 any picking together of the forks is avoided on the twigs being pressed together. The forks seize the twigs which are conveyed along therewith and press their stalks together so as to introduce the latter into the ring-shear in the required position. In Fig. 4, for the sake of clearness, none of the chains is shown completely, but one chain link provided with a fork 39 being shown. The ring-gear with drawing rollers, drive, etc. is arranged in an analogous manner as described with reference to Fig. 3, only the cutting prongs being thinner and more closely together to avoid the strobiles being cut through. The strobiles and leaves shorn off fall away laterally.

Referring to Figs. 6 and 7. This modified embodiment of shearing off the strobile bunches consists in that the hop twigs arrive at the ring-shear 41 through a funnel 40. To prevent the funnel being choked by the twigs and to facilitate their feeding movement, an endless chain 44 laid over sprockets 42 and 43 extends with the one branch through the funnel and ring-shear axis and is provided with lateral spherically pointed lugs 45 having the function of taking the twigs along therewith. One of said sprockets is driven. Such chains for facilitating the forward movement of the twigs may likewise be arranged sidewise on the funnel, as is illustrated in 46. In this case, the lugs 47 are set on individual chain links and may be of a greater length than in the above mentioned arrangement, since they need not pass through the ring-shear. Alternatively, it is possible to provide both the axially extending and the lateral chains. The necessary pressing together of the stalks of the hop twigs is operated in such case either as indicated in the Figs. 4 and 5 or by means of crank-driven forks 48 and 49 placed opposite each other in a similar arrangement as the chain forks 39. Owing to their obliquity, these forks exert, in addition to pressing the twigs together, a progressive movement with the twigs. In order to ensure a correct co-operation of the forks, the crank drives thereof are coupled together. The ring-shear 41 has thin cutting prongs to prevent the strobiles being cut through. The strobiles and leaves shorn off fall away laterally. The stalks may moreover be seized by rollers 50 and 51 of the kind referedd to above for facilitating the drawing through of the twigs.

Referring to Figs. 8-10. A number of ring-shears 52 are combined together in a ring-shear grate. Fig. 10 shows such a ring-shear on an enlarged scale. In this case the outer tube 53 is fixed whilst the inner tube 54 is rotating. The cutting prongs are thin thus preventing the strobiles being cut through. The fixed tubes of all ring-shears of the grate are inserted in a plate 55 of the ring-shear grate 56. The inner tubes are inserted within the fixed outer ones, so as to be easily rotatable and are moreover supported in a plate 57 of the ring-shear grate 56. Said inner tubes, by gravity, abut by a projection against a shoulder of the fixed tubes, thus being able to yield resiliently in the case of additional resistances to be met. The ring-shear grate is suspended on bars 58, and for facilitating the feed of the strobile bunches strewn thereupon through a hopper 59, a reciprocating movement is imparted thereon by a crank gear 60. This shaking movement may likewise be utilized for the drive of the rotatable inner tubes of the ring-shears. To this effect, racks 61 attached to the fixed frame of the device are brought into mesh with a gearing 62 provided on the rotary tubes of the ring-shears. In such manner said ring-shears are exerting, on the ring-shear grate being shaken, an alternating rotation, the strobile bunches arriving on the ring-shears being thus shorn apart and the individual strobiles thus formed falling out through the inner space of the ring-shears. To avoid choking the clearance between the ring-shears or hampering the cutting operation to be carried out on the strobile bunches, gliding members 63 are arranged in said clearances, said members being topwise spherically formed and exerting a reciprocating movement parallel to the ring-shear axis. This movement may likewise be derived from the shaking movement of the ring-shear grate 56. For this purpose, rodlike extensions 64 of the gliding members 63 are firmly inserted in cross bars 65 exerting the necessary swinging motion on the ring-shear grate being shaken in such a manner, that endwise wedgelike projections 66 abut against fixed pulleys 67 onto which they will be pressed by pulleys 68 under the influence of thrust springs 69 or like elements. The cross bars 65 are guided within the ring-shear grate 56 by lateral lugs 70 thus taking part in its shaking movement and moving only up and down in vertical slots 71. Thus the strobile and other plant organs shorn are thrown from the clearances between the ring-shears into the inner space of the latter and discharged. In Fig. 9 the two top rows of ring-shears are illustrated in section above the gearing 62 whilst the two bottom rows are shown in a top view. Therefore, the upper half of this figure discloses the bottom plate 57 and the racks 61 whilst the lower half shows the top plate 55 and the cross bars 65. To prevent the strobile bunches strewn on the ring-shear grate from accumulating, a coarse screen may be provided on top the hopper 59 to ensure a correct spreading of the strobile bunches.

The shearing operation may be enhanced by pressing the strobile bunches onto the ring-shears by the action of rods provided in the upwardly extending axis of the ring-shears and guided and driven in such a manner that they take part in the shaking movement of the ring-shear grate 56 and another swinging movement is imparted thereto in the direction of the axis mentioned above. The same effect may be achieved by a pneumatic pressure from above or by vacuum from below. In such case the ring-shear grate must be sealed against the supporting structure.

Referring to Figs. 11 and 12. In this case ring-shears 72 are arranged in rows on the circumference of a rotating drum, 73. The drum is supported in the usual manner endwise in rollers 74. The axial thrust of the drum is taken up by pulleys 75 arranged on the one end. Both the rollers and the pulleys on one end are arranged in carrier rings 76. To enable the inclination of the drum to be adjusted, said carrier rings may be supported in the machine frame by lateral pivots 77 the supporting arrangement for the one carrier ring being slidable. The ring-shears are arranged in a similar manner as described with reference to the previous modified embodiment. The alternating rotating movement of the inner tubes is derived from the drum rotation. To this effect, one of the carrier rings is provided laterally with a corrugated lug 78 against which pulleys 79 provided on levers 80 are pressed by tie-rods 81 and springs 82. The levers 80 are supported on the drum circumference, the springs abut against the articulated bearing arrangement 83 of the tie-rods 81. Racks 84 being in mesh with a gearing 85 of the inner tubes of the ring-shears are linked at 86 to the levers 80, at the other end in 87 to the levers 88 supported likewise on the drum circumference. On the drum being rotated, the levers 80 exert a swinging movement and the racks 84 swinging therewith impart an alternating rotating movement to the inner tubes of the ring-shears. The drum rotation is effected through a gearing 89 provided at the one end thereof. In the case of adjustable drum inclination the drive will be preferably led over one of the carrier ring pivots 77. The gearing 89 is in mesh with a front gear 90 connected fixedly to a bevel gear 91 being in mesh with another bevel gear 92 being in turn fixedly connected to the front gear 93 taking up the outward drive. The gears 92 and 93 are supported at one of the carrier pivots 77.

Through a funnel 94 the strobile bunches are led inside the drum to roll down the ring-shears thus being shorn into individual strobiles. The strobiles and other parts shorn off are discharged either through the inner space of the ring-shears or through sievelike holes 95 provided in the drum jacket between the ring-shear rows.

It is to be understood that all the driving devices have been designed and shown in the figures merely by way of example and may obviously be replaced by other known devices acting to the same effect, e. g. the racks by chains, etc.

The transport between the individual parts of the apparatus is carried out by known means, such as conveyors, bucket-elevators, pneumatically and the like. The whole plant may be driven by a motor of any kind. This motor may also be used for propelling the carriage whereon the apparatus is to be transported.

Since the above disclosed method allows of shearing off all strobiles from the hop stocks and as on removing the refuse only these strobiles which are too small to be utilized are eliminated, such cropped strobiles include also those of inferior quality which may be recognized by their brownish colour unlike the green or yellow-green strobiles of high grade quality.

These unsuitable strobiles may be eliminated by hand-picking, e. g., on a belt whereon the strobiles are conveyed or automatically in a known manner by using photocells.

The three working stages above described may be united in a single machine mounted on a carriage to be preferably portable or may preferably be carried into effect on two machines, one of which is arranged for shearing the hop stocks and twigs, the other for shearing the strobile bunches into individual strobiles and for separating the strobiles from the refuse material. Such division has the advantage, that the first machine can be smaller and lower so as to move easier through the hop yard thus facilitating the hop stocks to be approached. The other machine may be erected close to the hop drier. The mixture of strobile bunches and waste delivered by the first machine can be brought to the other machine in the well known hop carts.

It is also possible to design the plant in such manner that the mixture from several machines is conveyed to a common machine for shearing through and separating the waste.

I claim:

1. In a machine for cropping hops, a shearing device having two concentric comb-like shearing blades adapted to shear stalked strobiles from hop-twigs bearing strobile bunches, means for effecting relative movement between said blades of the shearing device, a stalk feeding device for the compulsory introduction of twigs and strobile bunches of the hop plants into said shearing device, and means for operating the shearing device.

2. In a machine for cropping hops, a shearing device having two concentric comb-like shearing blades adapted to shear stalked strobiles from cut hop twigs bearing strobile bunches, means for effecting relative movement between the blades of said shearing device, a stalk feeding device for the compulsory introduction of twigs and strobile bunches of the hop plants into said shearing device, and a combined drive for the shearing device and for the feeding device by which a predetermined ratio between the shearing speed of the shearing device and the feed-speed of the feeding device may be obtained.

3. In a machine for cropping hops, a shearing device having two concentric comb-like shearing blades adapted to shear stalked strobiles from cut hop twigs bearing strobile bunches, means for effecting relative movement between said blades of the shearing device, a stalk feeding device for the compulsory introduction of twigs and strobile bunches of the hop plants into said shearing device, a rotating mechanism by which the shearing device is operated, and a pressing device for pressing the hop twigs together before their entrance into the shearing device.

4. In a machine for cropping hops, a shearing device having two concentric comb-like shearing blades adapted to shear stalked strobiles from cut hop twigs bearing strobile means for effecting bunches, relative movement between the blades of said shearing device, a stalk feeding device for the compulsory introduction of twigs and strobile bunches of the hop plants into said shearing device, a rotating mechanism by which the shearing device is operated, a pressing device for pressing the hop twigs together before their entrance into the shearing device, said pressing device comprising movable forks for exerting in addition to the movement for pressing the twigs together an additional feeding movement of the pressed twigs to the cutting device.

5. In a machine for cropping hops, a shearing device having two concentric comb-like shearing blades adapted to shear stalked strobiles from cut hop twigs bearing strobile bunches, means for effecting relative movement between said blades of the shearing device, a stalk feeding device for the compulsory introduction of twigs and strobile bunches of the hop plants into said shearing device, a rotating mechanism by which the shearing device is operated, said feeding device comprising a funnel in advance of the shearing device for feeding the cut hop twigs and an endless driven chain extending with one branch through the funnel, said chain being provided with elements for taking the twigs along therewith.

6. In a machine for cropping hops, a shearing device having two concentric comb-like shearing blades adapted to shear stalked strobiles from cut hop twigs bearing strobile bunches, a driving mechanism for one of said blades of the shearing device, a stalk feeding device for the compulsory introduction of twigs and strobile bunches of the hop plants into said shearing device, a rotating mechanism by which the shearing device is operated, said feeding device comprising a funnel in advance of the shearing device for feeding the cut hop twigs, an endless driven chain extending with one branch through the funnel and the shearing device, said chain being provided with elements for taking the twigs along therewith.

7. In a machine for cropping hops, a shearing device having two concentric comb-like shearing blades adapted to shear stalked strobiles from cut hop twigs bearing strobile bunches, a driving mechanism for said blades of the shearing device, a stalk feeding device for the compulsory introduction of twigs and strobile bunches of the hop plants into said shearing device, a rotating mechanism by which the shearing device is operated, said feeding device comprising a funnel in advance of the shearing device for feeding the cut hop twigs, an endless driven chain extending with one branch through the opening of the funnel, and a second driven chain extending with one of its branches along the inner side walls of the funnel, each of said chains being provided with elements for taking the twigs along therewith.

8. In a machine for cropping hops, a plurality of upwardly directed ring-shears each having a motionless and a rotary tubular member, a horizontal grate upon which said plurality of ring-shears is arranged, said grate being suspended on bars and provided with a mechanism imparting to said grate a shanking motion, racks attached to the fixed frame of the machine, gearings provided on the rotary tubes on the ring-shears meshing with said racks so that the rotary tubes of the ring-shears exert a rotary movement alternately in both directions on the shaking movement of said ring-shear grate.

9. In a machine for cropping hops, a plurality of ring-shears each having a motionless and a rotary tubular member, a horizontal grate upon which said plurality of ring-shears are arranged, said grate being suspended on bars and provided with a mechanism imparting to said grate a shaking motion, racks attached to the fixed frame of the machine, gearings provided on the rotary tubes on the ring-shears meshing with said racks so that the rotary tubes of the ring-shears exert a rotary movement alternately in both directions on the shaking movement of said ring-shear grate, and gliding members provided between the individual ring-shears to exert a swinging motion parallel to the ring-shear axes thus throwing the shorn blossoms of the hop plants into the inner space of the ring-shears for discharge.

10. In a machine for cropping hops, a plurality of upwardly directed ring-shears each having a motionless and a rotary tubular member, a horizontal grate upon which said pluarlity of ring-shears are arranged, said grate being suspended on bars and provided with a mechanism imparting to said grate a shaking motion, racks attached to the fixed frame of the machine, gearings provided on the rotary tubes on the ring-shears meshing with said racks so that the rotary tubes of the ring-shears exert a rotary movement alternately in both directions on the shaking movement of said ring-shear grate, and gliding members provided between the individual ring-shears to exert a swinging motion parallel to the ring-shear axes thus throwing the shorn blossoms of the hop plants into the inner space of the ring-shears for discharge, and transmission means between said grate and said gliding members by which the shaking movement of the ring-shear grate is used as driving power for said gliding members.

11. In a machine for cropping hops, an inclined rotary drum with a perforated wall, a funnel through which stalks with bunches of hop strobiles may be led inside the drum, ring-shears arranged with their shearing parts directed inwardly of said drum for shearing strobile bunches into individual strobiles with remaining short stalks and a transmission device for the drive of the shearing parts of the ring-shears and operable by the rotating movement of the drum.

12. In a machine for cropping hops, in inclined rotary drum with a perforated wall and a peripherally corrugated projection, a funnel through which stalks with bunches of hop strobiles may be led inside the drum, ring-shears arranged with their shearing parts directed inwardly of said drum for shearing strobile bunches into individual strobiles with remaining short stalks and a transmission device for the drive of the shearing parts of the ring-shears and operable by the rotating movement of the drum, said transmission device comprising a lever carrying a pulley and pressed through the action of springs towards the said corrugated projection of the drum so that on the drum being rotated the swinging motion of said pulley lever imparts an oscillating movement to the rotatable tubes of the ring-shears.

13. In a machine for cropping hops, an inclined rotary drum with a perforated wall, a funnel through which the stalks with bunches of hop strobiles may be led inside the drum, a plurality of comb-like double shearing blades arranged to project inwardly from the inner circumference of said inclined rotary drum, and a transmission device on the drum by which the drive of the shearing parts of the double shearing blades is derived from the rotating movement of the drum, said shearing blades cutting the strobile bunches into individual strobiles, said strobiles being discharged through said perforations of said drum.

14. In a machine for cropping hops, an inclined rotary drum with a perforated wall and a peripherally corrugated projection, a funnel through which stalks with bunches of hop strobiles may be led inside the drum, a plurality of comb-like double shearing blades arranged to project inwardly from the inner circumference of said inclined rotary drum and a transmission device by which the drive of the shearing parts of the double shearing blades is derived from the rotating movement of the drum, said transmission device comprising a lever carrying a pulley and pressed through the action of springs towards the said corrugated projection of the drum so that when the drum is rotated the oscillation of said pulley lever imparts reciprocation to the movable shearing blades of the shearing device.

VLADISLAV SÝKORA.